(12) United States Patent
Chang et al.

(10) Patent No.: US 8,320,978 B2
(45) Date of Patent: Nov. 27, 2012

(54) DEVICE HOUSING

(75) Inventors: Shuo-Hsiu Chang, Taipei Hsien (TW); Wei Deng, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 263 days.

(21) Appl. No.: 12/577,917

(22) Filed: Oct. 13, 2009

(65) Prior Publication Data

US 2011/0050054 A1    Mar. 3, 2011

(30) Foreign Application Priority Data

Sep. 3, 2009   (CN) .......................... 2009 1 0306540

(51) Int. Cl.
*H04M 1/00*        (2006.01)
(52) U.S. Cl. ............... 455/575.1; 455/575.3; 455/575.4; 455/575.8

(58) Field of Classification Search .... 455/575.1–575.9, 455/90.3, 123, 347; 312/223.1–223.4; 345/905; 379/433.1
See application file for complete search history.

(56) References Cited

U.S. PATENT DOCUMENTS

| | | | |
|---|---|---|---|
| 7,089,571 B2* | 8/2006 | Volk et al. ...................... 720/630 |
| 7,684,178 B2* | 3/2010 | Hsu et al. ................. 361/679.21 |
| 2004/0087333 A1* | 5/2004 | Hutchison et al. .......... 455/550.1 |
| 2008/0063218 A1* | 3/2008 | Weber et al. ..................... 381/87 |
| 2008/0117576 A1* | 5/2008 | Gao et al. ....................... 361/681 |
| 2008/0218371 A1* | 9/2008 | Joo .......................... 340/815.65 |
| 2009/0054115 A1* | 2/2009 | Horrdin et al. ............. 455/575.8 |
| 2009/0059502 A1* | 3/2009 | Filson et al. .................. 361/681 |
| 2010/0061040 A1* | 3/2010 | Dabov et al. ............. 361/679.01 |

* cited by examiner

*Primary Examiner* — Marisol Figueroa
*Assistant Examiner* — Dung Hong
(74) *Attorney, Agent, or Firm* — Altis Law Group, Inc.

(57) ABSTRACT

A device housing includes a glass plate, a plastic frame, a metal member and an adhesive member. The glass plate is received in the plastic frame. The metal member is connected to the plastic frame. The adhesive member connects the glass plate to the plastic frame. The glass plate, the plastic frame, the metal member and the adhesive member are integrally formed, and the adhesive member is sandwiched between the glass plate and the plastic frame.

13 Claims, 10 Drawing Sheets

DEVICE HOUSING

CROSS-REFERENCE TO RELATED APPLICATIONS

This application is related to four co-pending U.S. patent applications, application Ser. Nos. 12/577,902 and 12/577,906, and both entitled "DEVICE HOUSING," application Ser. No. 12/577,912, and entitled "FASTENER AND DEVICE HOUSING USING THE SAME," application Ser. No. 12/577,924, and entitled "METHOD FOR MANUFACTURING DEVICE HOUSING." The co-pending applications have the same assignee as the present application.

BACKGROUND

1. Technical Field

The present disclosure relates generally to device housings and, more particularly, to a device housing for an electronic devices.

2. Description of Related Art

With developments in technology, electronic devices such as mobile phones are not only required to perform many functions, but also provide an appearance appealing to the user.

Referring to FIGS. 9 and 10, a frequently used housing 10 for a mobile phone includes a frame 11 and a glass plate 12 received therein. The frame 11 is substantially rectangular, and forms a positioning portion 113 on an inner surface. During assembly of the device housing 10, the adhesive 20 is coated on the positioning portion 113. The glass plate 12 is received in the frame 11, and attached to the positioning portion 113. Thus, the glass plate 12 and the frame 11 are glued together. The adhesive 20 is generally epoxy resin glue, which can only be used once.

However, a gap may form between the glass plate 12 and the frame 11, out of which the adhesive 20 may overflow, affecting appearance. Furthermore, the adhesive 20 may not uniformly cover the positioning portion 113, such that a top surface of the glass plate 12 may misalign with a top surface of the frame 11. The appearance of the device housing 10 is again affected.

Therefore, a device housing overcoming the described limitations is desirable.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
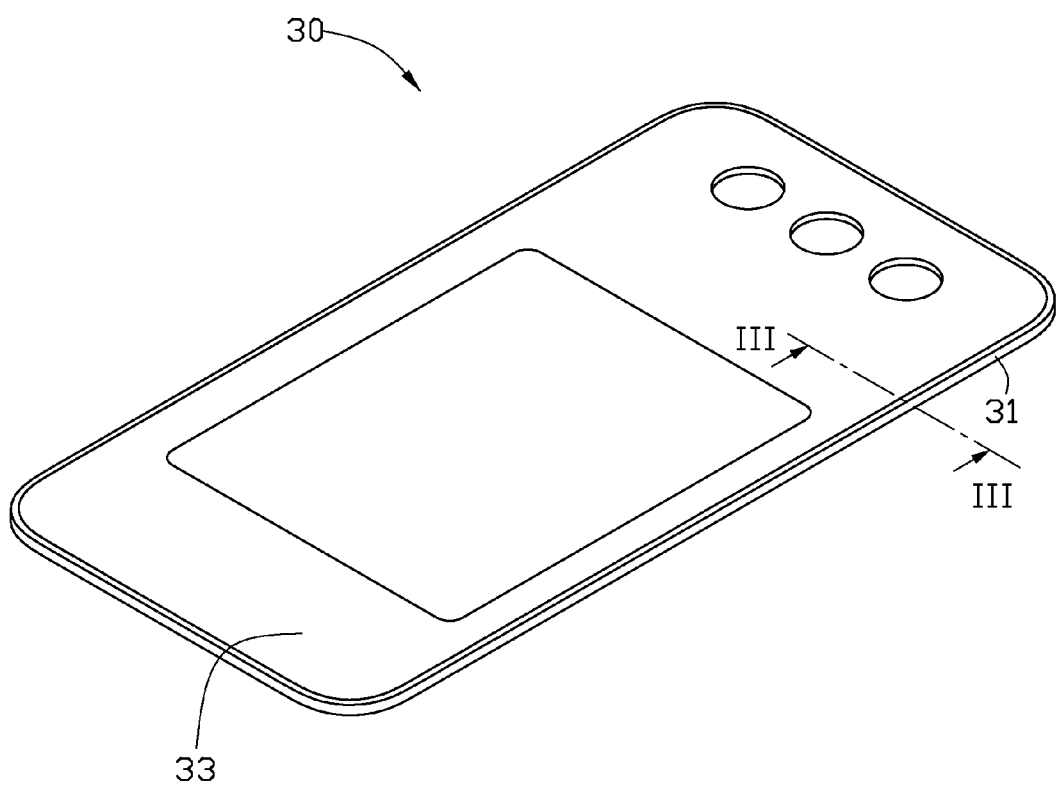
FIG. 1 is an isometric view of a first embodiment of a device housing.
Figure 2:
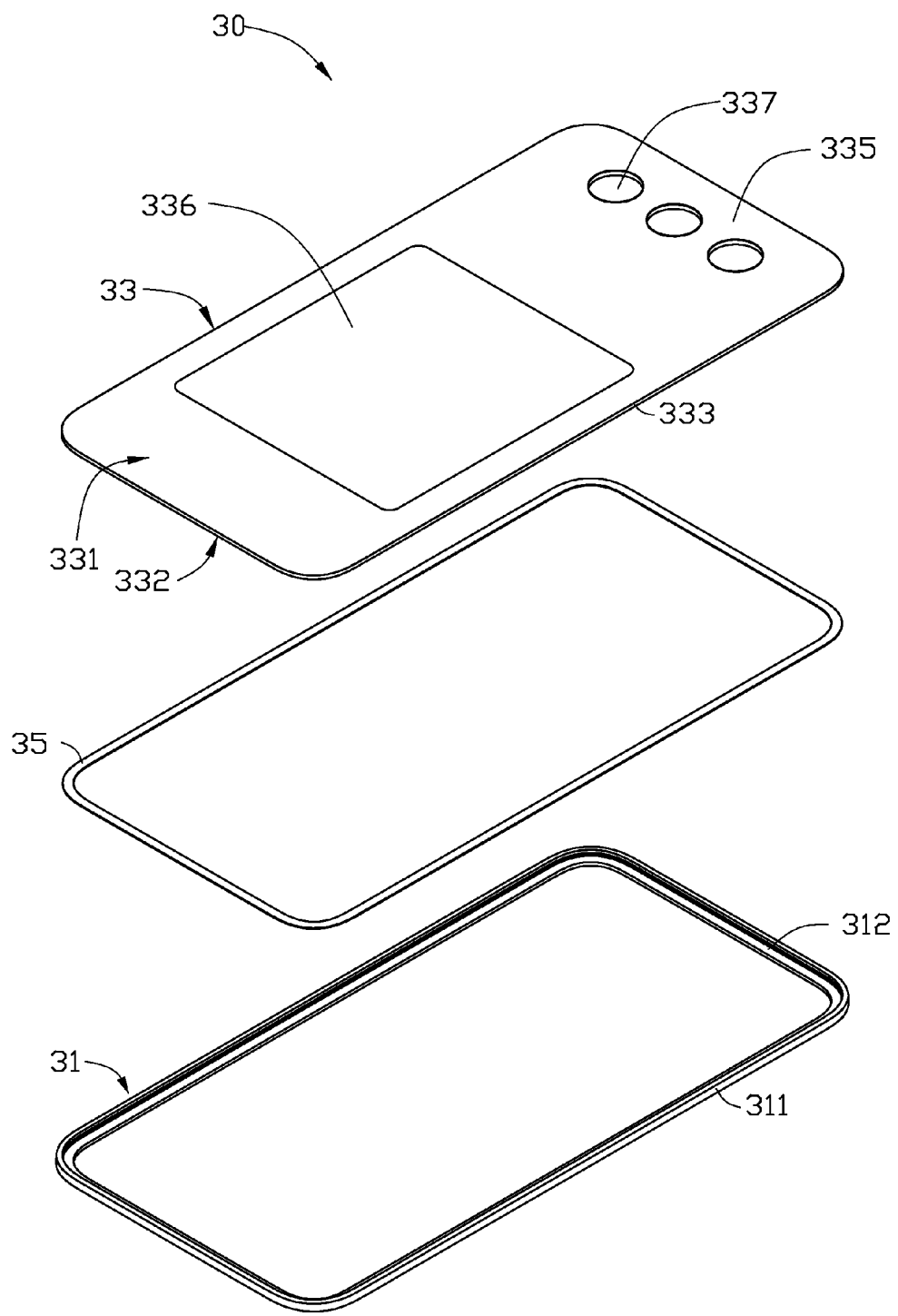
FIG. 2 is an exploded isometric view of the device housing of FIG. 1.
Figure 3:
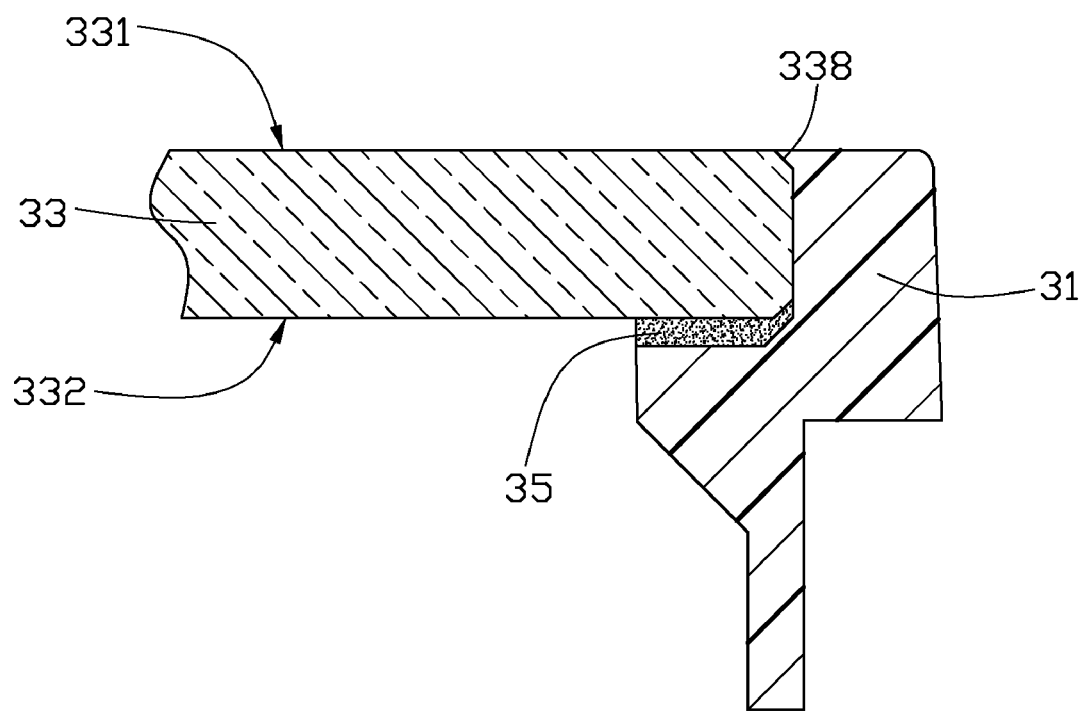
FIG. 3 is a cross-section of the device housing of FIG. 1 taken along line III-III.

Referring to FIGS. 1 through 3, a first embodiment of a device housing 30 is integrally formed by a plastic frame 31, a glass plate 33, and an adhesive member 35. In the illustrated embodiment, the device housing 30 is used with an electronic device (not shown).

The plastic frame 31 includes a side frame 311 and an annular positioning portion 312 formed on an inner surface of the side frame 311. The plastic frame 31 can be formed by injection molding (not shown). In the illustrated embodiment, the side frame 311 is substantially rectangular. The plastic frame 31 is comprised of nylon and fiberglass.

The glass plate 33 includes a first surface 331, a second surface 332 opposite to the first surface 331, and a side surface 333 connecting the first surface 331 with the second surface 332. A periphery of the first surface 331 is coated with printing ink to form a light shielding portion 335 and a light guiding portion 336 surrounded by the light shielding portion 335. An end of the glass plate 33 defines three assembly holes 337 arranged side by side. A chamfer angle 338 is formed on an edge of the first surface 331 and the second surface 332 to enhance structural integrity of the glass plate 33. In the illustrated embodiment, the glass plate 33 is substantially rectangular.

The adhesive member 35 is polyurethane glue in this embodiment. The polyurethane glue can be liquefied to aid adhesion in damp and high temperature conditions (more than about 60 degrees Celsius), and solidified to provide adhesion in dry and normal temperature conditions. Thus, the adhesive member 35 can be used repeatedly. In the illustrated embodiment, the adhesive member 35 is substantially a rectangular ring corresponding to the positioning portion 312 of the plastic frame 31.

The device housing 30 can be integrally formed by molding as follows: printing the adhesive member 35 on the edge of the glass plate 33 and drying the adhesive member 35; positioning the glass plate 33 in the injection mold; injecting melted plastic material to the side surface 333 of the glass plate 33 to form the plastic frame 31, and the adhesive member 35 generating adhesion in damp and high temperature conditions; cooling the device housing 30 such that the plastic frame 31 connects to the glass plate 33 with no gap, and the adhesive member 35 sandwiched between the plastic frame 31 and the glass plate 33 to enhance a connecting strength therebetween.

Since the plastic frame 31 and the glass plate 33 are integrally formed via the injection mold, there is no gap therebetween, and a top surface of the glass plate 33 can align with a top surface of the plastic frame 31. Thus, the device housing 30 has an unspoiled appearance. In addition, the adhesive member 35 is printed on the glass plate 33, and the device housing 30 is integrally formed, thus manufacturing efficiency is greatly improved.

It should be pointed out that the plastic frame 31 and the glass plate 33 may be other shapes, for example, the glass plate 33 may be an ellipse, and the plastic frame 31 is an ellipsular ring. In addition, the chamfer angle 338 may be formed only on an edge of the first surface 331 or the second surface 332.

Figure 4:
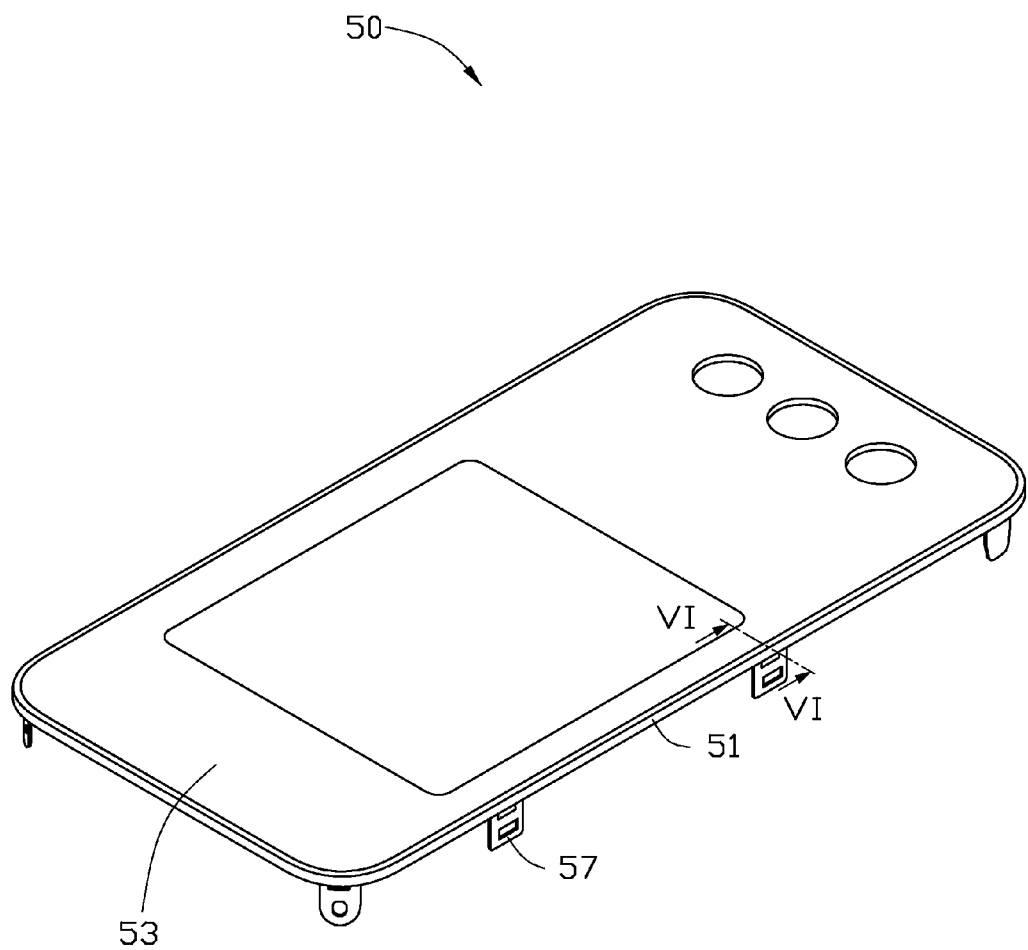
FIG. 4 is an isometric view of a second embodiment of a device housing.
Figure 5:
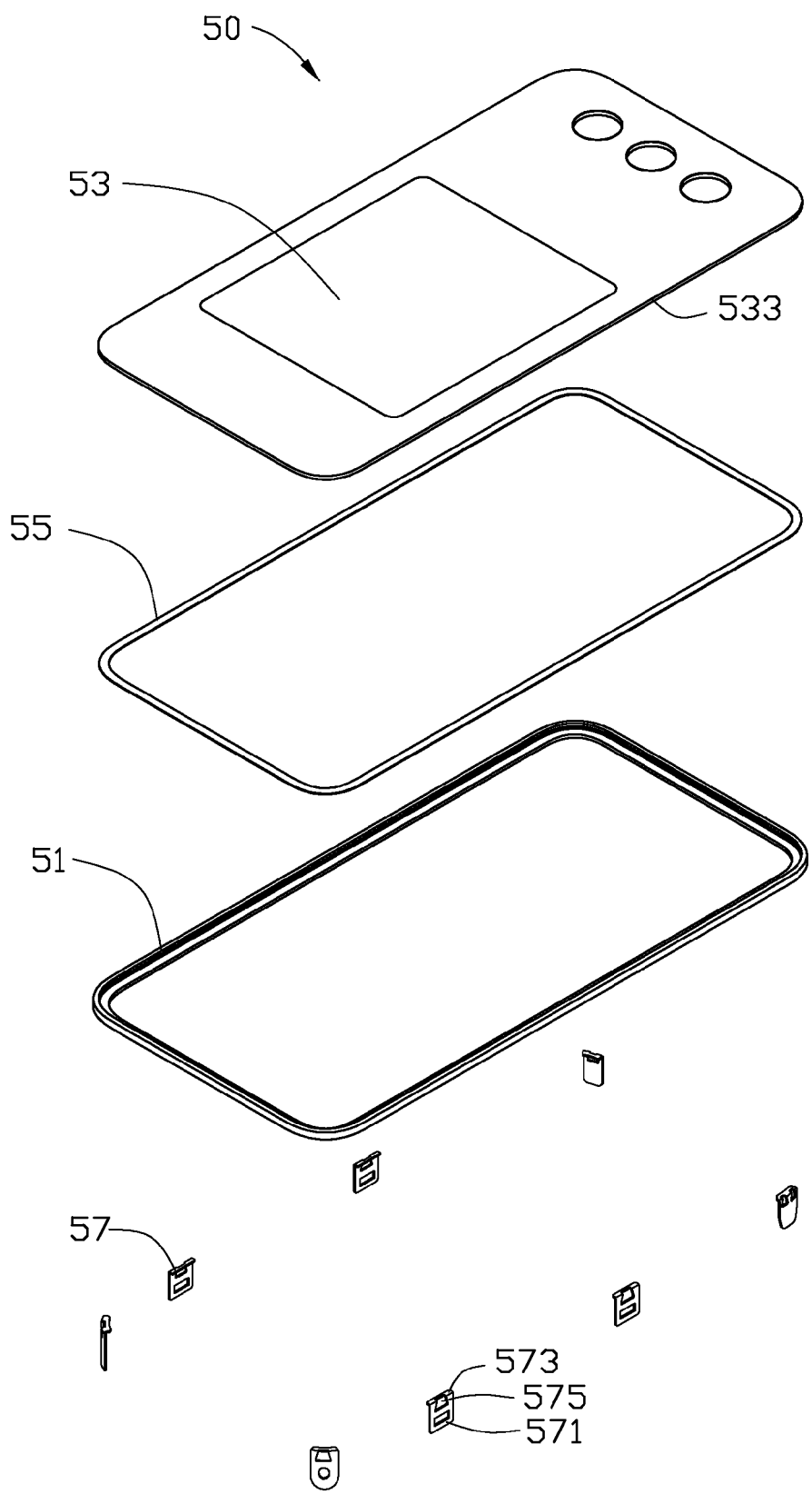
FIG. 5 is an exploded isometric view of the device housing of FIG. 4.
Figure 6:
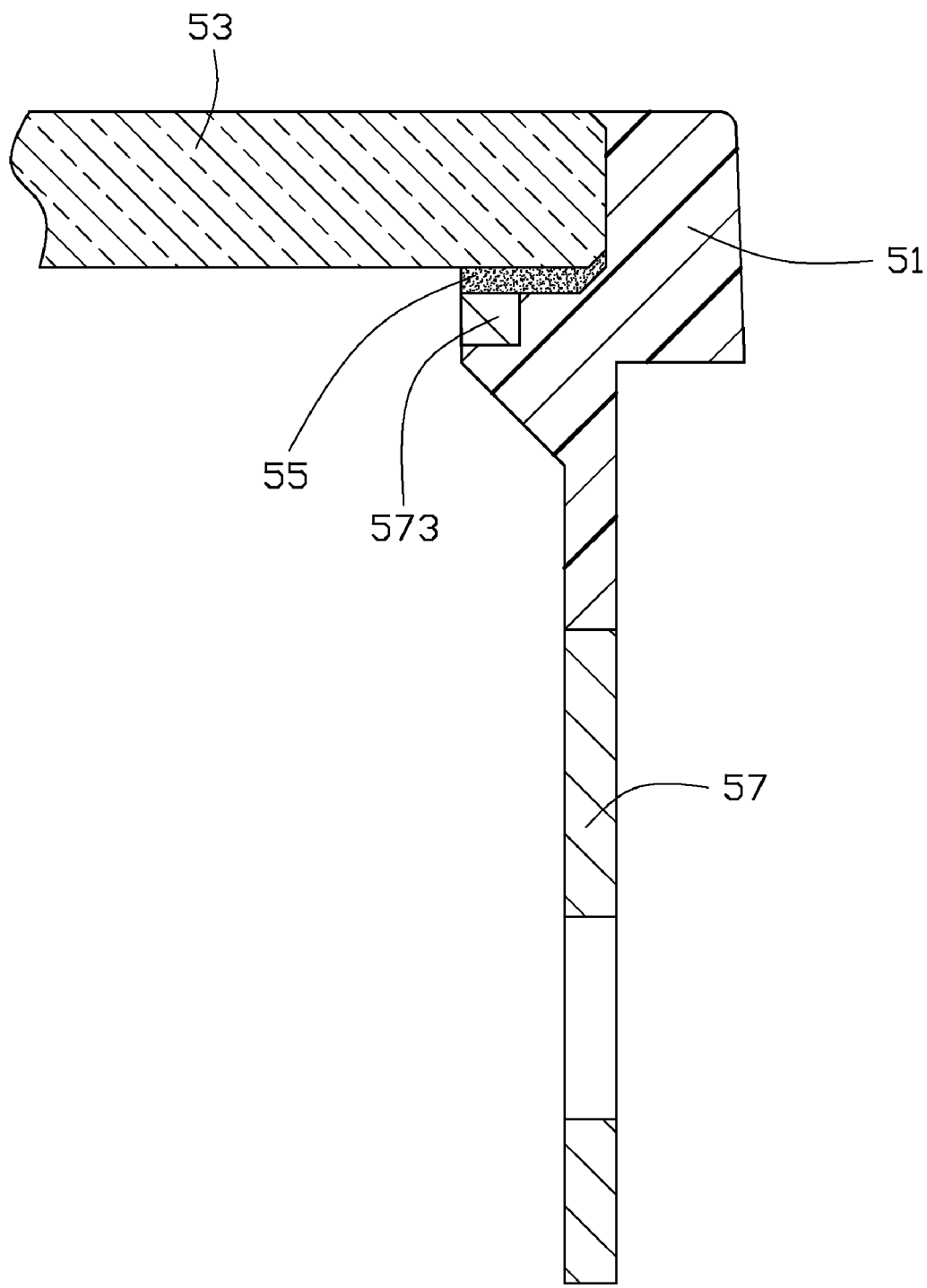
FIG. 6 is a cross-section of the device housing of FIG. 4 taken along line VI-VI.

Referring to FIGS. 4 through 6, a second embodiment of a device housing 50 is integrally formed by a plastic frame 51, a glass plate 53, an adhesive member 55, and a plurality of metal members 57. The plastic frame 51, the glass plate 53, and the adhesive member 55 have structure similar to the first embodiment of the plastic frame 31, the glass plate 33, and the adhesive member 35 of the device housing 30 respectively. In the illustrated embodiment, the metal members 57 are stainless steel.

Each metal member 57 includes a main body 571 and a hook portion 573 extending from an end of the main body 571. Each metal member 57 defines one or more connecting holes 575. The one or more connecting holes 575 accepts molten plastic therethrough in an injection process. The connecting holes 575 are filled with plastic material after the melted plastic material is cooled.

The device housing 50 can be integrally formed by molding as follows: printing the adhesive member 55 on the edge of the glass plate 53 and drying the adhesive member 55; positioning the glass plate 53 and the metal members 57 in the injection mold, the metal members 57 corresponding to the edge of the glass plate 53, and the hook portion 573 attached to the adhesive member 55; injecting melted plastic material to the side surface 533 of the glass plate 53 and the metal members 57 to form the plastic frame 51, and the adhesive member 55 generating adhesion in damp and high temperature conditions; cooling the device housing 30, with the plastic frame 31 connecting the glass plate 33 and the metal members 57 with no gap, and the adhesive member 35 sandwiched between the plastic frame 31, the glass plate 33, and the metal members 57 to enhance a connecting strength therebetween. The device housing 50 presents an unspoiled appearance, and is easily manufactured. The metal members 57 can also engage other components of the electronic device.

In an alternative embodiment, the metal members 57 can be positioned in the injection mold with a certain distance between the adhesive member 55 and the metal members 57.

Figure 7:
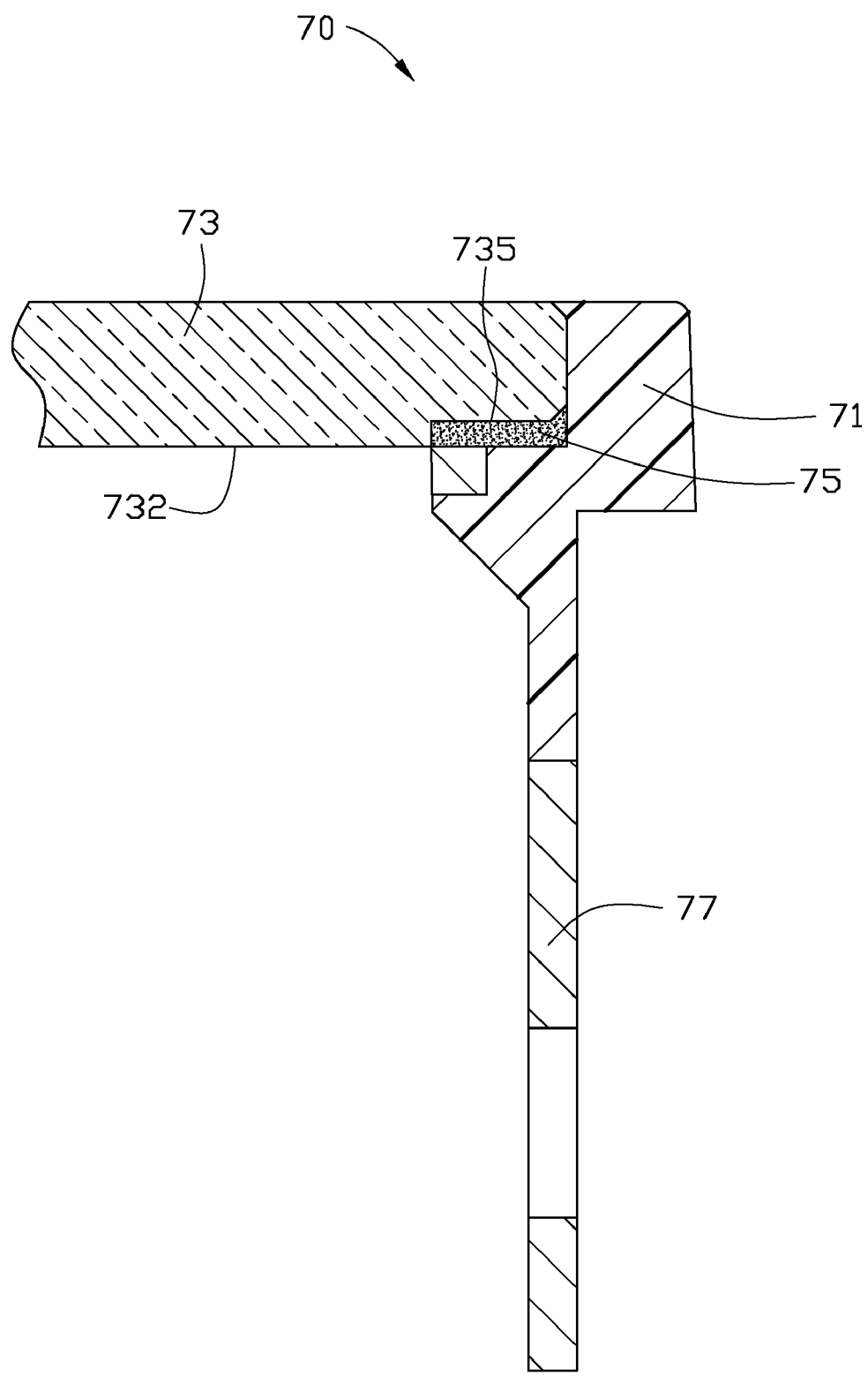
FIG. 7 is an isometric view of a third embodiment of a device housing.

Referring to FIG. 7, a third embodiment of a device housing 70 is integrally formed by a plastic frame 71, a glass plate 73, an adhesive member 75, and a plurality of fastening members 77. The device housing 70 differs from the device housing 50 of the second embodiment only in that the glass plate 73 defines an annular receiving groove 735 on an edge of a second surface 732. The adhesive member 75 is received in the receiving groove 735. A thickness of the device housing 50 can be less than that of the device housing 50 because the adhesive member 75 is received in the receiving groove 735. Alternatively, the glass plate 73 can define the receiving groove 735 in the side surface.

Figure 8:
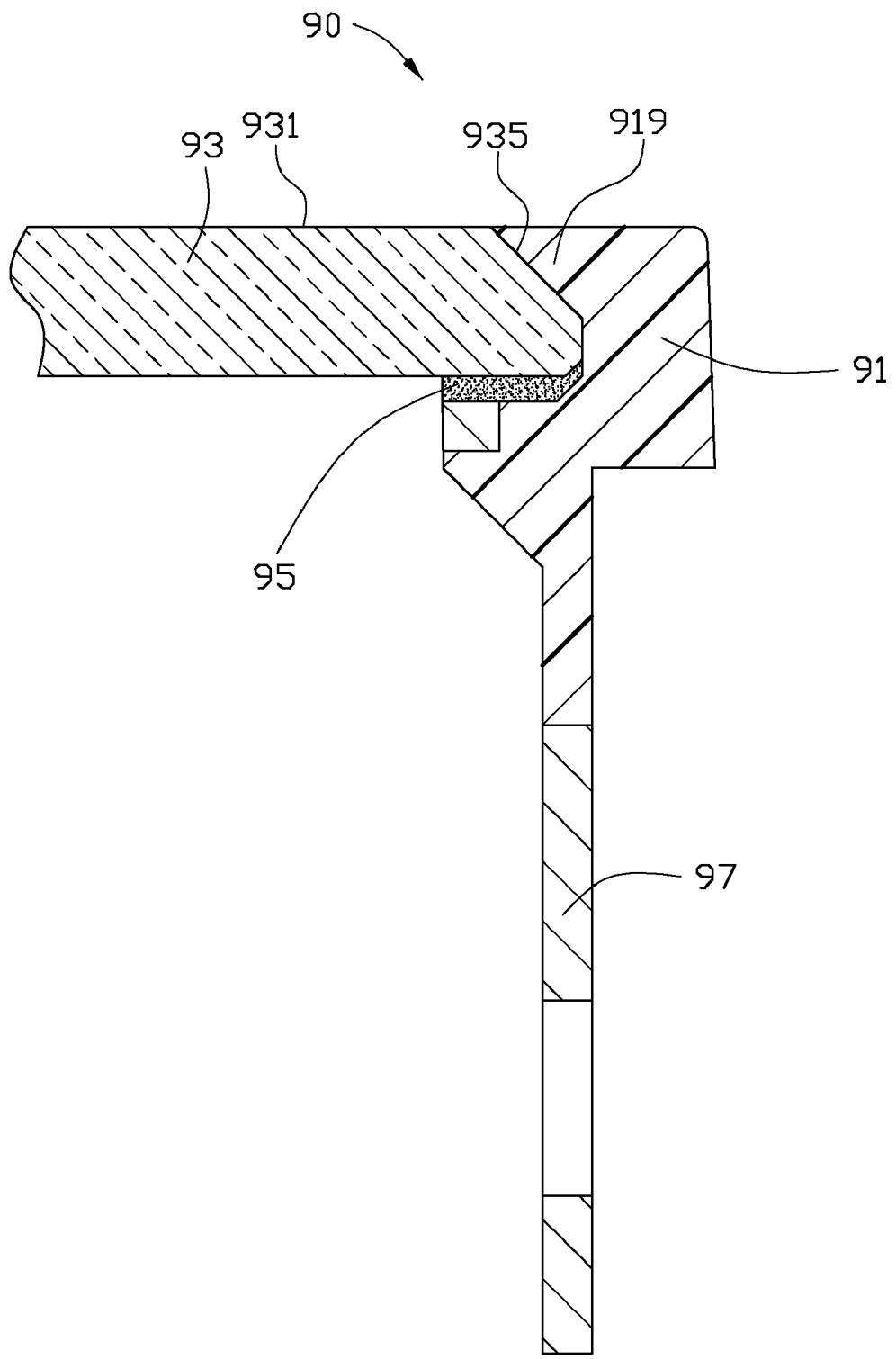
FIG. 8 is an isometric view of a fourth embodiment of a device housing.
Figure 9:
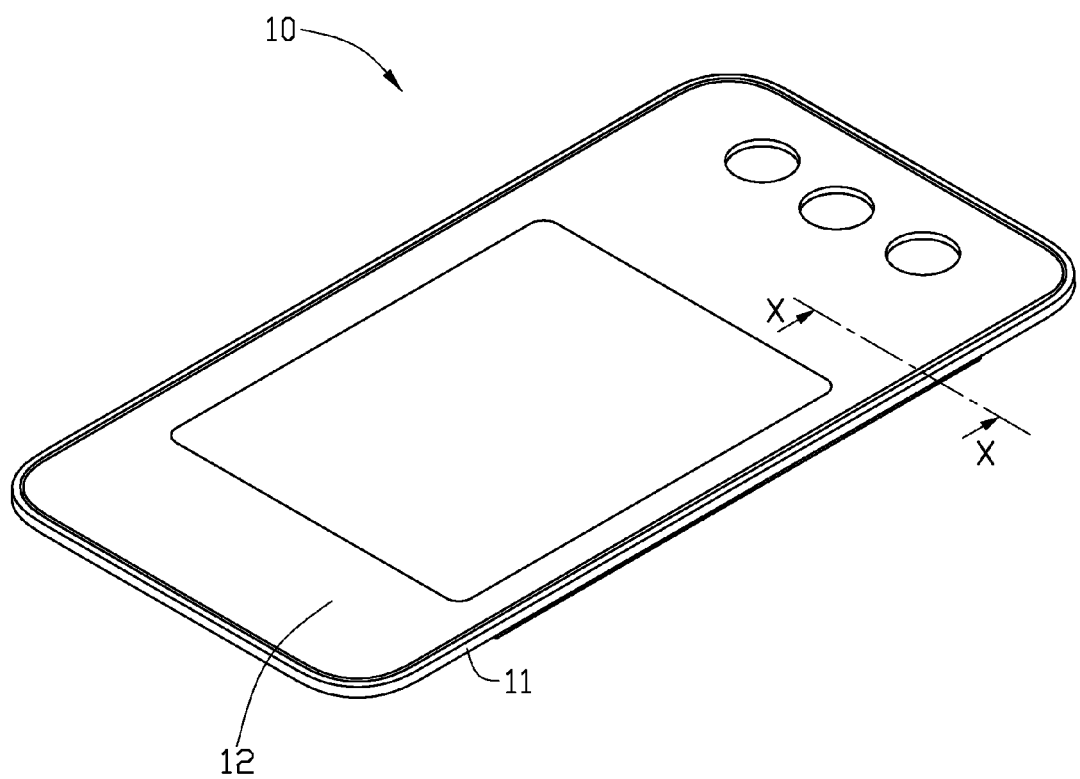
FIG. 9 is an isometric view of a commonly used device housing.
Figure 10:
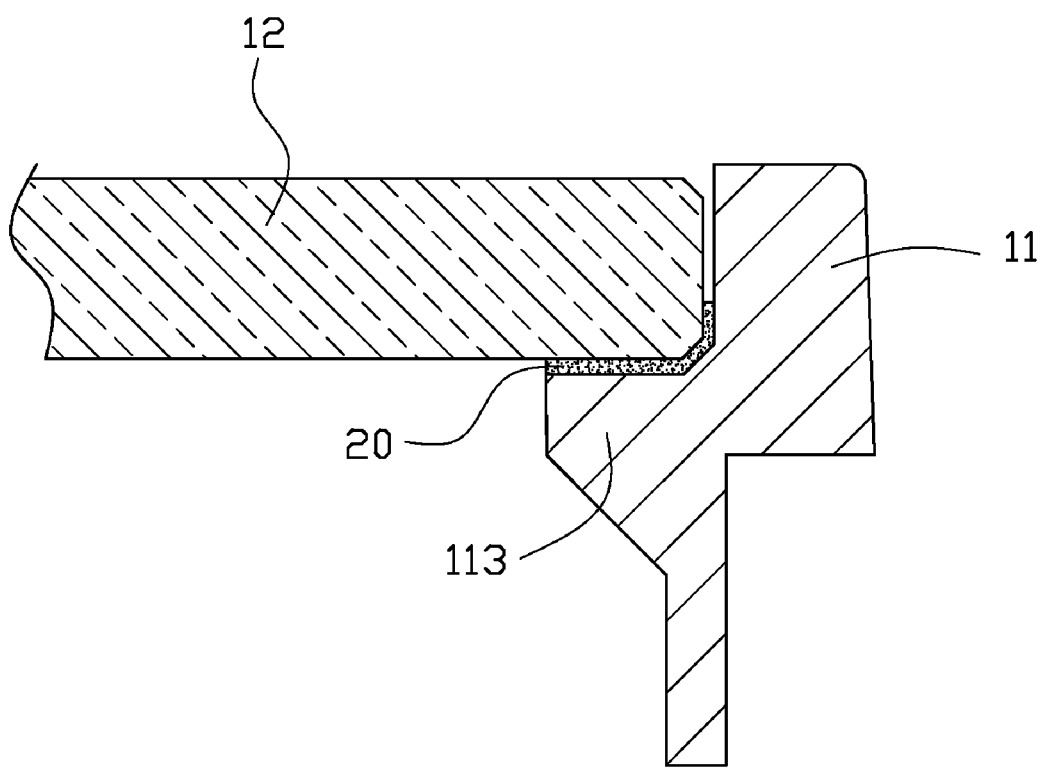
FIG. 10 is a cross-section of the device housing of FIG. 9 taken along line X-X.

Referring to FIG. 8, a fourth embodiment of a device housing 90 is integrally formed by a plastic frame 91, a glass plate 93, an adhesive member 975, and a plurality of fastening members 97. The device housing 90 differs from the device housing 50 of the second embodiment only in that the glass plate 93 forms a connecting surface 935 on an edge of a first surface 931. The plastic frame 91 forms a connecting portion 919 on the connecting surface 935. In the illustrated embodiment, the connecting surface 935 is angled. A combination strength of the device housing 90 is stronger than that of the device housing 50 of the second embodiment because the plastic frame 91 has a connecting portion 919 positioned on the connecting surface 935 of the glass plate 93.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A device housing, comprising:
    a glass plate;
    a plastic frame for receiving the glass plate;
    an adhesive member attaching to an edge of a bottom surface of the glass plate and connecting the glass plate to the plastic frame; and
    a metal member connected to the plastic frame, wherein the metal member comprises a main body and a hook portion extending from an end of the main body, the hook portion engaging with the plastic frame and attached to the adhesive member;
    wherein the glass plate, the plastic frame, the metal member and the adhesive member are integrally formed by molding, and the adhesive member is sandwiched between the glass plate and the plastic frame, such that there is no gap between a side surface of the glass plate and the plastic frame.

2. The device housing of claim 1, wherein the adhesive member is polyurethane glue.

3. The device housing of claim 1, wherein the metal member is glued to the adhesive member.

4. The device housing of claim 1, wherein the metal member is stainless steel.

5. The device housing of claim 1, wherein the metal member defines at least one connecting hole penetrating through the metal member for partly receiving the plastic frame.

6. The device housing of claim 1, wherein the plastic frame comprises a side frame and an annular positioning portion formed on an inner surface of the side frame, and the glass plate is located on the positioning portion and surrounded by the side frame.

7. The device housing of claim 1, wherein the adhesive member is glued to the positioning portion of the plastic frame.

8. The device housing of claim 1, wherein the glass plate defines a receiving groove on an edge thereof for receiving the adhesive member.

9. The device housing of claim 1, wherein the glass plate forms a connecting surface on an edge thereof, and the plastic frame forms a connecting portion on the connecting surface of the glass plate.

10. The device housing of claim 9, wherein the connecting surface is slanted to the side surface of the glass plate.

11. The device housing of claim 1, wherein the plastic frame is comprised of nylon and fiberglass.

12. The device housing of claim 1, wherein the glass plate comprises a first surface and a second surface opposite to the first surface, and at least one of the first surface and the second surface forms a chamfer angle at an edge of the glass plate.

13. The device housing of claim 12, wherein a periphery of the first surface is coated with printing ink to form a light shielding portion and a light guiding portion surrounded by the light shielding portion.

* * * * *